United States Patent [19]
Erhardt

[11] 3,911,745
[45] Oct. 14, 1975

[54] RESISTANCE REFERENCE JUNCTION COMPENSATOR

[75] Inventor: William K. Erhardt, Richboro, Pa.

[73] Assignee: Honeywell Inc., Minneapolis, Minn.

[22] Filed: Dec. 13, 1974

[21] Appl. No.: 532,475

[52] U.S. Cl. .................................. 73/341; 73/361
[51] Int. Cl.² ........................................ G01K 7/12
[58] Field of Search ............ 73/341, 361; 338/28, 30

[56] References Cited
UNITED STATES PATENTS

| | | | |
|---|---|---|---|
| 1,228,678 | 6/1917 | Johnson | 73/361 |
| 2,780,097 | 2/1957 | McKinlay | 73/361 |
| 3,069,909 | 12/1962 | Hines | 73/361 |
| 3,459,925 | 8/1969 | Goosey et al. | 73/341 |
| 3,845,443 | 10/1974 | Fisher | 338/28 X |

*Primary Examiner*—Richard C. Queisser
*Assistant Examiner*—Frederick Shoon
*Attorney, Agent, or Firm*—Arthur H. Swanson; Lockwood D. Burton; J. Shaw Stevenson

[57] ABSTRACT

A reference junction compensator for a multi-thermocouple activated temperature measuring circuit is an electrically equivalent of an ice bath cold junction compensator. The compensator includes a reference resistor forming a major portion of a printed circuit board. The resistor is retained against an isothermal terminal panel that contains the input terminals of each one of a plurality of thermocouples. The printed circuit reference resistor is interspersed about each pair of terminals and extends along substantially all remaining portions of the board that is in contact with the panel whereby the change in temperature of the reference resistor is maintained at substantially the same value as the temperature of the isothermal terminal panel. The resultant integrated effect which is afforded by the resistor pattern of the resistance compensator provides an accurate, rapid means of neutralizing any adverse heating and/or cooling temperature effects on the input terminals of any one or more of the aforementioned thermocouples and their associated measuring circuit.

6 Claims, 2 Drawing Figures

RESISTANCE REFERENCE JUNCTION COMPENSATOR

BACKGROUND OF THE INVENTION

1. Field of the Invention

The present invention relates to a resistance reference junction compensator commonly referred to as a cold junction compensator.

2. Description of the Prior Art

Before one can properly evaluate a voltage generated by any one of the thermocouples employed in a multi-input potentiometer in terms of temperature, it is necessary to provide some way to maintain the temperature of the reference junction constant or to compensate for temperature changes occurring at the reference junction.

In the prior art, the reference junction has been held at a known temperature by, for example, placing it in a pipe that is driven into the ground or in a chamber insulated from changes in ambient temperature surrounding the chamber. These arrangements have not been entirely satisfactory because of the unusually large amount of space that is required for the installation of such devices.

Another and more suitable, less bulky way of meeting the problem of temperature changes in reference junctions of any one of the thermocouples in a multi-input thermocouple measuring system is to introduce a compensating voltage that opposes the thermocouple voltage variation caused by the varying temperature of the reference junction, whereby the resultant voltage remains practically constant. This has been accomplished by placing a wire wound temperature sensitive reference resistor, forming one leg of an electrical temperature measuring bridge circuit, against the center of an isothermal panel. The panel, in turn, is used to provide spaced areas for the input terminals of each of the aforementioned thermocouples, including the reference junction.

One disadvantage of the last-mentioned reference junction temperature compensating system is that adverse changes which occur in the ambient temperature of any portion of the so-called isothermal panel cannot be immediately sensed by the compensating reference resistor. This temperature transfer lag occurs because the aforementioned change in ambient temperature must be transmitted from a side of the isothermal panel where such a change in temperature is occurring to the central portion of the block where the wire wound compensating resistor is located.

SUMMARY OF THE INVENTION

It is an object of the present invention to provide an improved temperature measuring apparatus.

It is another object of the present invention to provide an improved temperature measuring apparatus as set forth and which includes improved reference junction compensation for a thermocouple system.

It is a further object of the present invention to provide a reference junction compensating resistor for automatically and instantaneously negating the adverse effect that ambient temperature changes have on the input terminals of any one or more thermocouples that are associated with a potentiometric measuring circuit.

In carrying out the aforementioned and other objects of the invention, there is provided a reference junction compensator for a multi-thermocouple activated temperature measuring circuit that is an electrically equivalent of an ice bath cold junction compensator. This compensator is preferably a reference resistor which forms a major portion of a printed circuit board and which is retained against an isothermal panel containing the input terminals of each of a plurality of thermocouples. The reference resistor is so laid out in a printed circuit fashion on its associated board that it is interspersed about each pair of terminals and distributed over substantially all of the remaining portions of the board whereby the presence of temperature gradients across the panel can be sensed by the reference resistor.

This improved printed circuit construction for the reference resistor thus provides a more accurate and more rapid means of neutralizing the adverse heating and/or cooling effect occurring at the input terminals of any one or more of the aforementioned thermocouples and their associated measuring circuit.

BRIEF DESCRIPTION OF DRAWINGS

A better understanding of the present invention may be had when the following detailed description is read in connection with the accompanying drawings in which.

DESCRIPTION OF THE PREFERRED EMBODIMENT

Figure 1:
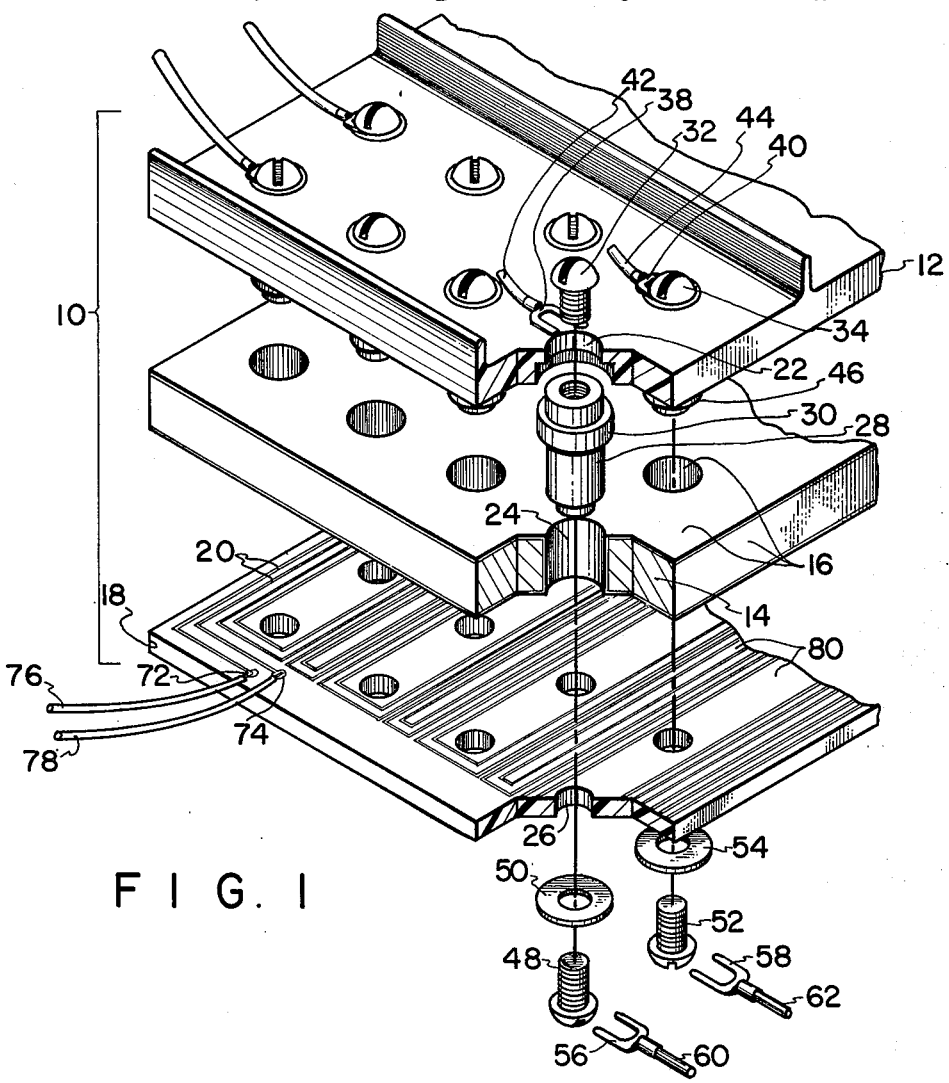
FIG. 1 is an exploded view of a reference compensating resistor embodying the present invention.

For an understanding of the preferred embodiment of the invention reference will be first made to FIG. 1. A compensating reference terminal block 10 is comprised of three portions, namely, an insulator molded barrier block 12; an isothermal panel 14 made of a thermoconductive material, such as aluminum having an anodized surface 16; and a printed circuit board or substrate 18 having a temperature sensitive compensating resistor 20 that is preferably in the form of an electrically conductive copper material. The anodized surface 16 of the aluminum panel 14 provides electrical insulation to avoid short circuiting both the thermocouple terminals and the resistor 20.

A plurality of aligned holes 22, 24, 26 are formed in the parts 12, 14 and 18, respectively, of terminal block 10. Brass terminal posts 28, 46 have a collar 30 which, when assembled, rests on the top surface of the isothermal panel 14. The post 28 extends vertically through the holes 22, 24, 26 and has its upper and lower ends exposed to atmosphere. Each of the posts 28, 46 is internally threaded to receive terminal screws 32, 34, by which the tang ends 38, 40 of the thermocouple lead wires 42, 44 are secured to the terminal posts 28, 46.

Figure 2:
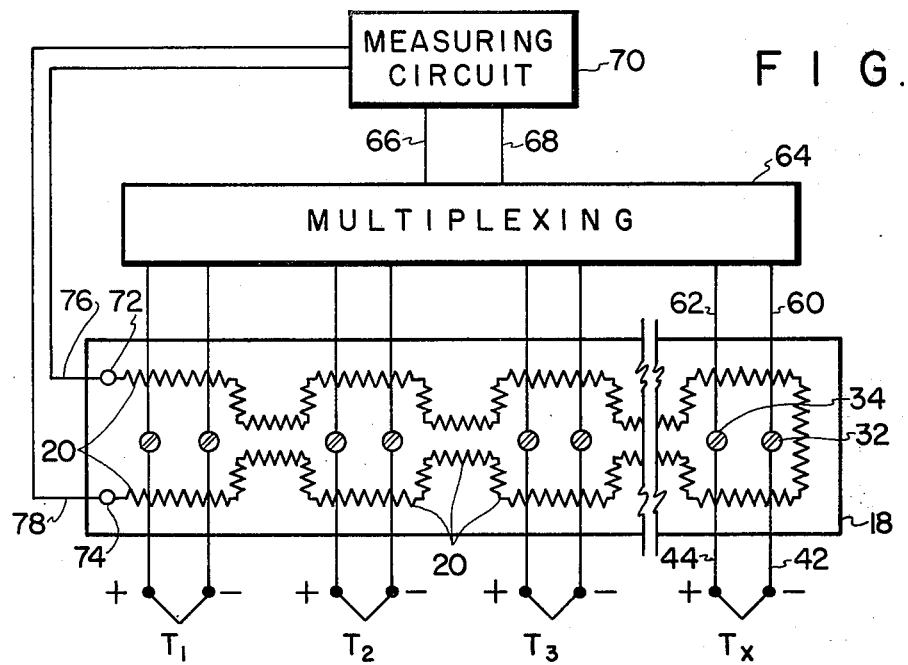
FIG. 2 is a schematic circuit diagram of a multi-thermocouple actuated measuring circuit embodying the present invention.

Similar terminal screws 48, 52 are received in the opposite ends of the posts 28, 46. Washers 50, 54 are employed to provide a good electrical connection of the terminal ends 56, 58 with their associated posts 28, 46. The terminal tangs 56, 58 of output lead wires 60, 62 are secured to the terminal posts 28, 46 by the screws 48, 52. The other end of the conductors 60, 62 are connected to a multiplexing unit 64 as is best shown in FIG. 2. The multiplexing unit 64 in turn is electrically connected by means of the conductors 66, 68 to a measuring circuit 70, which may be a conventional electric bridge circuit.

As shown in FIG. 1, the temperature sensitive compensating resistor is etched on the printed circuit board 18 in a serpentine pattern interspersed about each pair of terminals, 28, 46. The printed circuit type of resistor pattern 20 in the board 18 extends and is distributed over substantially an entire flat surface thereof. The board 18 is of substantially the same size as the isothermal panel 14 and is retained in intimate contact therewith by means of the screw and washer connections 48, 50; 52, 54 in combination with the shouldered terminal posts 28, 46.

The molded insulator barrier block 12 is also made of substantially the same size as the isothermal block 14 with which it is in contact.

The compensating resistor 20 made of the previously-mentioned printed circuit temperature sensitive material has end terminations 72, 74 that are connected to the measuring circuit 70 by a pair of conductive wires, e.g., copper wires 76, 78 to form one leg of an electrical temperature measuring bridge.

A suitable thermal grease 80, preferably a silicon heat sink compound identified as Dow Corning 340, is applied between the resistor 20 and panel 14 to insure good surface-to-surface thermal contact between the reference compensating resistor 20 and the isothermal panel 14.

Other types of resistances can be employed for the printed circuit resistor 20 just described. For instance, a wire, a thick film or any other form of material that is capable of being added to the substrate to form the resistor pattern thereon that is equivalent to resistor 20 to which reference has been previously made.

MODE OF OPERATION

In order for the measuring circuit 70 to properly evaluate a voltage generated by a thermocouple, e.g. $T_1$, in terms of temperature, it is necessary to compensate for any temperature changes of the reference junction, e.g., 42, 32, 28 of the thermocouple.

The present invention solves this problem by providing a compensating reference resistor 20 in the form of a resistor of a temperature sensitive material on a printed circuit board 18 that is positioned against an isothermal panel 14 in such a manner that the resistor 20 extends along the isothermal panel 14 and around each of a number of input terminals, e.g., 38, 40 that are connected to input terminal posts 28, 46 that are inserted in the block 14.

Since the printed circuit board 18 is made of the same size as the isothermal panel 14 and since the temperature sensitive resistor 20 is attached to the board 18 which extends over practically the entire surface area of the board 18 and the panel 14, the temperature gradient of the compensating reference resistor 20 will be substantially the same as the temperature gradient of the isothermal panel 14.

When an ambient temperature change occurs in the environment, for example, at one side of the isothermal panel 14, such a change will be immediately sensed by the portion of the reference resistor 20 that is nearest that portion of the panel. Since a portion of the comtpensating reference resistor 20 is in contact with the portion of the panel 14 sensing this temperature change, the resistor 20 will also immediately sense when such an ambient temperature change takes place.

As this ambient temperature change is thermally distributed in a uniform manner by the isothermal panel 14 to the remaining portions thereof, the heat that is being thermally distributed by the panel 14 will also be applied in an integrating fashion to the other remaining portions of the resistor 20. This resultant integrated affect occurring on the resistance compensator 20 increases the compensating accuracy. This reduces the transient errors caused by thermal response of a centrally located compensator that has heretofore been used in the prior art.

When a change in the temperature of the resistor 20 takes place, the so-called IR drop or voltage change that this resistor will introduce into one leg of the conventional temperature measuring electric circuit 70 will also be altered.

Since the temperature sensitive resistor thus acts as one leg of a bridge of the measuring circuit 70, it will provide a rapid, continuous way of introducing a corrective voltage input signal therein that accurately represents temperature changes which occur in the so-called cold junction or reference terminal of the thermocouples.

A temperature sensitive reference resistor 20 on a printed circuit board 18 is thus disclosed for use with an isothermal panel 14 for providing an improved, more rapid and accurate means of compensating for changes occurring at the so-called cold junction or reference input terminals of thermocouples than has heretofore been possible with the previously-mentioned prior art reference compensating devices.

The embodiments of the invention in which an exclusive property or privilege is claimed are defined as follows:

1. A resistance reference junction compensator for a multi-thermocouple activated temperature measuring circuit, comprising a non-conductive substrate and an isothermal panel, said isothermal panel having means therein to provide separate terminals for each of a plurality of thermocouples, said substrate and panel having flat areas that are substantially equal and mounted in surface-to-surface engagement with one another, said substrate having a temperature sensitive reference resistor formed on said flat contacting surface thereof, said resistor being distributed over substantially all of said surface of said substrate and interspersed about said terminals, whereby said resistor responds to temperature changes when the temperature of one or several of said terminals are altered by a change in ambient temperature.

2. The resistance reference junction compensator as defined in claim 1 wherein said reference resistor is an etched material that is laminated to said substrate.

3. The resistant reference junction compensator as defined in claim 1 wherein said reference resistor is a material that has been added to said substrate.

4. The resistance reference junction compensator as defined in claim 1 wherein the resistor is a wire.

5. The resistor reference junction compensator as defined in claim 1 wherein the resistor is a thick film material.

6. The thermocouple reference terminal compensator as defined in claim 1 wherein the thermal response of the resistor has substantially the same thermal response as the isothermal panel.

* * * * *